United States Patent
Nagata et al.

[11] Patent Number: 5,332,786
[45] Date of Patent: Jul. 26, 1994

[54] REACTIVE HOTMELT ADHESIVE COMPOSITION

[75] Inventors: Mitsuo Nagata, Saitama; Toshiyuki Adachi; Masatoshi Asakura, both of Shiga, all of Japan

[73] Assignee: Sekisui Chemical Co., Ltd., Osaka, Japan

[21] Appl. No.: 34,618

[22] Filed: Mar. 19, 1993

Related U.S. Application Data

[63] Continuation of Ser. No. 587,918, Sep. 25, 1990, abandoned.

[30] Foreign Application Priority Data

Sep. 27, 1989 [JP] Japan ................................ 1-250964

[51] Int. Cl.$^5$ .................... C08L 45/02; C08L 75/04; C08L 93/04
[52] U.S. Cl. .................... 525/130; 525/455; 528/75; 528/85
[58] Field of Search .................. 525/130, 455; 528/75, 528/85

[56] References Cited

U.S. PATENT DOCUMENTS

| | | | |
|---|---|---|---|
| 3,931,077 | 1/1976 | Uchigaki et al. | 525/130 |
| 4,775,719 | 10/1988 | Markevka et al. | 525/125 |
| 4,820,368 | 4/1989 | Markevka et al. | 525/93 |

FOREIGN PATENT DOCUMENTS

61-14222  1/1986  Japan .

Primary Examiner—James J. Seidleck
Assistant Examiner—Thomas Hamilton, III
Attorney, Agent, or Firm—Armstrong, Westerman, Hattori, McLeland & Naughton

[57] ABSTRACT

A reactive hotmelt adhesive composition comprising a urethane prepolymer having an isocyanate group at each end and obtained by reacting a diisocyanate with a polyolefin diol having a hydroxyl group at each end, and a tackifier substantially unreactive with the urethane prepolymer and compatible therewith.

7 Claims, No Drawings

| # REACTIVE HOTMELT ADHESIVE COMPOSITION

This application is a continuation of application Ser. No. 07/587,918 filed Sep. 25, 1990, now abandoned.

BACKGROUND OF THE INVENTION

The present invention relates to reactive hotmelt adhesive compositions having adhesive characteristics in respect of both reactivity (curability through reaction) and hotmelt applicability.

Reactive hotmelt adhesive compositions are already known which comprise a urethane prepolymer having an isocyanate group at each end and obtained by the reaction of polypropylene glycol or like polyether diol with tolylene diisocyanate or like diisocyanate, and rosin ester resin, coumarone-indene resin or terpene phenolic resin which is substantially not reactive but compatible with the urethane prepolymer and admixed as a tackifier with the prepolymer (see, for example, Unexamined Japanese Patent Publication SHO 61-115977 and Examined Japanese Patent Publication SHO 51-30898).

However, the urethane prepolymer obtained by reacting a diisocyanate with a polyether diol is poor in compatibility with various tackifiers and is therefore usable only with specified tackifiers like those mentioned above. Accordingly, the adhesive compositions still remain to be improved in properties.

For example, the adhesive composition containing rosin ester resin is insufficient in heat resistance, whereas the one incorporating coumarone-indene resin gives off a strong offensive odor. The adhesive composition comprising terpene phenol resin is unsatisfactory in storage stability. Moreover, any of these adhesive compositions is insufficient in weather resistance. These compositions further require a relatively long period of time to obtain useful bond strength, hence a low reaction velocity, and they have yet to improved in this respect.

SUMMARY OF THE INVENTION

The main object of the present invention is to provide a reactive hotmelt adhesive composition which is free of the above problems.

The present invention provides a reactive hotmelt adhesive composition which comprises a urethane prepolymer having an isocyanate group at each of its opposite ends and obtained by reacting a diisocyanate with a polyolefin diol having a hydroxyl group at each of its opposite ends, and a tackifier substantially unreactive with the urethane prepolymer and compatible therewith.

The urethane prepolymer used according to the present invention has higher compatibility with various tackifiers than the conventional prepolymer obtained with use of the polyether diol and is therefore usable in combination with a wide variety of tackifiers to give reactive hotmelt adhesive compositions.

Further according to the present invention, the properties of the urethane prepolymer of the above-specified structure and the properties of the tackifier admixed therewith improve the reactive hotmelt adhesive composition in storage stability, viscosity stability for application, initial as well as final adhesion, heat resistance, weather resistance, etc., further giving a higher reaction velocity and ensuring a diminished unpleasant odor.

Accordingly, the adhesive composition of the present invention is well-suited for use in producing building materials, rolling-stock components, electric or electronic members and the like with use of plastics, wood, metals, etc.

DESCRIPTION OF THE PREFERRED EMBODIMENTS

The polyolefin diol having a hydroxyl group at each end and to be used in the present invention has a saturated hydrocarbon skeleton like low-molecular-weight polyolefins and the hydroxyl group at each end of the skeleton, and differs in structure from the polyether diols for use in the prior art and from polyester diols.

Preferably, the molecular weight of the polyolefin diol is in the range of 1,000 to 3,000. Available as such a polyolefin diol is, for example, POLYTAIL (registered trademark) of Mitsubishi Kasei Corporation.

The diisocyanate to be reacted with the polyoleffin diol is, for example, 4,4'-diphenylmethane diisocyanate, 2,4-tolylene diisocyanate, 2,6-tolylene diisocyanate, hexamethylene diisocyanate or 1,5-naphthylene diisocyanate.

The polyolefin diol having hydroxyl endings and an excess of diisocyanate, when subjected to addition polymerization by the usual method, afford a urethane prepolymer having an isocyanate group at each end. Preferably, the urethane prepolymer thus obtained has an isocyanate content generally of 1.2 to 3.3 wt. % and a melt viscosity in the range of 1,000 to 2,000,000 cps at 85° C. More preferably, the melt viscosity is in the range of 1,000 to 30,000 cps.

If the isocyanate content is less than 1.2 wt. %, the urethane prepolymer has an excessively high melt viscosity. Conversely, if the content is over 3.3 wt. %, the prepolymer releases a strong odor due to the isocyanate group and exhibits too low a melt viscosity. When the melt viscosity at 85< C. is lower than 1,000 cps, the composition exhibits reduced initial (instantaneous) adhesion, forms a soft film after curing on reaction and fails to give strength against heat.

Examples of tackifiers usable for the present invention are a wide variety of resins including rosin ester resins (rosin esters, hydrogenated rosin esters and the like), terpene resins (polyterpene resin, terpene phenolic resin, aromatic modified terpene resin, hydrogenated products of such resins, etc.), petroleum resins ($C_5$ aliphatic, $C_9$ aromatic and $C_9$ alicyclic resins, hydrogenated products of such resins, etc.), styrene resins (homopolymers of styrene, $C_5$ monomer-styrene copolymer, $C_9$ monomer-styrene copolymer and the like), etc.

It is desired that the tackifier be compatible with the urethane prepolymer, completely inert or almost completely inert to and substantially unreactive with the isocyanate group of the prepolymer, and 40° to 150° C. in softening temperature. Petroleum resins are especially desirable from the viewpoint of initial adhesion, odor and color.

If the tackifier is active on and reacts with the isocyanate group of the urenthane prepolymer, the hotmelt adhesive composition obtained by kneading the two components together with heating then exhibits reduced reactivity and impaired moisture-curability and is undesirable.

When the proportion of the tackifier is too small, the composition exhibits reduced initial adhesion and reduced eventual adhesion, whereas presence of an excess of the tackifier renders the composition brittle and fails to give high bond strength, so that the proportion is preferably in the range of 30 to 70 wt. %.

Insofar as the object of the present invention can be achieved, base resins, softners, waxes and like additives, which are generally used for hotmelt adhesives, can be incorporated into the reactive hotmelt adhesive composition of the present invention.

Examples of useful base resins are ethylene-vinyl acetate copolymer (EVA), ethylene-ethyl acrylate copolymer (EEA), styrene-butadiene block copolymer (SBS), styrene-isoprene block copolymer (SIS), styrene-ethylene-butylene block copolymer (SEBS), polyethylene, atactic polypropylene, thermoplastic linear polyester, thermoplastic linear polyurethane and the like.

Examples of useful softeners are aromatic oils, liquid paraffins, phthalate plasticizers and the like. Examples of useful waxes are low-molecular-weight polyethylene, microcrystalline wax, polymerized waxes, etc. The urethane prepolymer prepared with use of a polyolefin diol having a hydroxyl group at each end has good compatibility also with these ingredients. Also usable are inorganic fillers, coloring agents, antioxidants, etc.

The reactive hotmelt adhesive composition of the present invention is applicable at low temperatures of 70° to lower than 100° C., whereas the composition can be applied at a temperature of not lower than 100° C. free of trouble as the case may be. The present composition is applied with use of a hotmelt applicator such as a hotmelt coater, a hotmelt spray and the like. The amount of adhesive composition to be used is placed in portions from time to time into the melt container of the applicator for use.

According to the present invention, a urethane prepolymer is used which has an isocyanate group at each end and which is prepared by reacting a diisocyanate with a polyolefin diol having a hydroxyl group at each end (with the molecular weight of the diol, and the isocyanate content and the viscosity of the prepolymer suitably determined for actual use). The urethane prepolymer exhibits improved compatibility with various tackifiers.

Accordingly, it has become possible to use tackifiers, such as petroleum resins, which give excellent properties when admixed with the urethane prepolymer, consequently affording a reactive hotmelt adhesive composition which is outstanding in various properties, such as storage stability, reaction velocity and weather resistance.

The present invention will be described with reference to the following examples and comparative examples.

First, before the preparation of reactive hotmelt adhesive compositions of the present invention, a urethane prepolymer (polyolefin type) for use in the invention and a urethane prepolymer (polyether type) for use in the conventional reactive hotmelt adhesive composition were tested for compatibility with different tackifiers, base resins, softeners, etc.

More specifically, a polyolefin diol (POLYTAIL H, product of Mitsubishi Kasei Corporation) having a hydroxyl group at each end and 1500 in molecular weight was reacted with 4,4′-diphenylmethane diisocyanate for addition polymerization in the usual manner to prepare a urethane prepolymer (polyolefin type) having an isocyanate group at each end for use in the invention. The urethane prepolymer was 2.5 wt. % in isocyanate content and 7,500 cps in melt viscosity at 85° C.

The urethane prepolymer in an amount of 50 wt. % was kneaded with 50 wt. % of the tackifier, base resin, softener or the like listed in Table 1 by a kneader with heating at a temperature not lower than the softening points of the two ingredients to check with the unaided eye whether the ingredients mixed together homogeneously and whether a phase separation occurred at 20° C. The result was evaluated according to the criteria of: A for excellent, B for good, and C for poor. The above procedure was repeated for all the materials given in Table 1, which also shows the results achieved.

For comparison, polypropylene glycol and diphenylmethane diisocyanate were subjected to addition polymerization in the usual manner to prepare a urethane prepolymer (polyether type) having an isocyanate group at each end for use in the prior art. This urethane prepolymer was 3.0 wt. % in isocyanate content and 800 cps in melt viscosity at 85° C.

The comparative urethane prepolymer was tested for compatibility in the same manner as above. Table 1 shows the results.

TABLE 1

| Material | Trade name | Compatility of urethane prepolymer | |
|---|---|---|---|
| | | Polyolefin type | Polyether type |
| Tackifier | | | |
| Hydrogenated rosin ester | ESTER GUM H | A | A |
| Terpene phenol resin | YS POLYSTER S145 | A | A |
| $C_5$ petroleum resin | QUINTONE N 180 | A | C |
| $C_9$ petroleum resin | NEOPOLYMER S | A | C |
| Hydrogenated petroleum resin | ARKON P-100 | A | C |
| Coumarone-indene resin | ESUCRON V-120 | C | A |
| Base resin | | | |
| EVA resin | EVAFLEX EV150 | A | C |
| EEA resin | NUC 6070 | A | C |
| SIS resin | CARIFLEX 1007 | A | C |
| SEBS resin | KRATON G1652 | A | C |
| SBS resin | TUFPRENE A | A | C |
| Softener, etc. | | | |
| Liquid paraffin | CRYSTOL 352 | A | C |
| Phthalic acid plasticizer | DOP | A | B |
| Paraffin wax | PARAFFIN WAX | A | C |
| Microcrystalline wax | SASOL WAX H | A | C |

The results of Table 1 reveal that the urethane prepolymer (polyolefin type) for use in the present invention exhibits excellent compatibility with the various tackifiers, base resins, softeners, etc. The prepolymer is therefore usable with a wide variety of tackifers, base resins, softeners and the like to afford reactive hotmelt adhesive compositions.

In contrast, the conventional urethane prepolymer (polyether type) was compatible with specific tackifiers only and exhibited poor compatibility with the other tackifiers, base resins, softeners and the like.

EXAMPLE 1

A polyolefin diol (POLYTAIL H, product of Mitsubishi Kasei Corporation) having a hydroxyl group at each of its opposite ends and 2,000 in molecular weight was reacted with diphenylmethane diisocyanate for addition polymerization in the usual manner to prepare a urethane prepolymer (polyolefin type) having an isocyanate group at each of its opposite ends. The urethane prepolymer was 2.0 wt. % in isocyanate content and 6,500 Cps in melt viscosity at 85° C.

The urethane prepolymer in an amount of 50 wt. % and 50 wt. % of a $C_9$ aromatic petroleum resin (NEOPOLYMER S, product of Nippon Petrochemicals Co., Ltd.) serving as a tackifier were uniformly kneaded together at 120° C. by a kneader to prepare a reactive hotmelt adhesive composition. The composition was tested for the evaluation of properties. Table 2 shows the results.

The properties were determined by the following methods.

(1) Melt Viscosity

The melt viscosity of the urethane prepolymer as heated at 85° C. was measured according to JIS K-6862 using a BM-type viscometer. In the case of the adhesive composition, the composition was heated at 100° C. for measurement.

(2) Storage Stability

A 200 g quantity of the adhesive composition was hermetically enclosed in a synthetic resin bag laminated with aluminum over the surface and was then allowed to stand in an oven at 90° C. When the resulting viscosity was not greater than twice the initial viscosity, the composition was evaluated as acceptable, and the period of time taken for the viscosity to increase to twice the initial value is listed in Table 2. The word "over" shown in the table means that the test was discontinued upon the lapse of the listed period.

(3) Viscosity Stability

The viscosity of the composition was measured upon lapse of 4 hours and 8 hours in the same manner as in the case of melt viscosity. The composition was evaluated as acceptable when the viscosity measurement was not greater than twice the initial value. The composition is fully useful when the viscosity measurements obtained 4 and 8 hours later were not greater than twice the initial value.

(4) Reaction Velocity

The adhesive composition was applied to two acrylic resin panels to a thickness of 30 to 150 micrometers using a roll coater heated at 90° C. Upon lapse of 30 seconds as open time, the acrylic resin panels were adhered to each other under pressure and allowed to stand at 20° C. at 60% R.H. to cure the composition. The period of time required to obtain useful bond strength was measured.

(5) Initial (Instantaneous) Adhesion

In a constant-temperature constant-humidity chamber at 20° C. and 60% R.H., an assembly of acrylic resin panels obtained by the method (4) was subjected at its one end to a shearing load of 100 g immediately after the panels were affixed to each other to measure the time required for the adhesive joint to break. The test was discontinued upon lapse of 1 hour.

(6) Final Adhesion

An assembly of acrylic resin panels adhered together by the method (4) was allowed to stand in a constant-temperature constant-humidity chamber at 20° C. and 60% R.H. for 24 hours. While being maintained at a temperature of 20° C. or 80° C., the assembly was thereafter pulled at a rate of 25 mm/min using a tensilon tensile tester to measure tensile shear bond strength (kg/25 mm×25 mm).

(7) Weather Resistance

The adhesive composition was applied in the form of a series of beads, 100 mm in length and 5 mm in width, to a glass panel and then exposed to light by a xenon weatherometer to measure the time required for the deterioration of the surface. The test was discontinued upon lapse of 150 hours.

(8) Offensive Odor

The adhesive composition was heated at 140° C. and checked for an offensive odor by a sensory test.

(9) Compatibility

In the same manner as in the compatibility test, the adhesive composition was kneaded by a kneader with heating at 120° C. and checked with the unaided eye as to whether the components were mixed together homogeneously and whether a phase separation occurred at 20° C. The result was evaluated according to the same criteria A, B and C as already stated.

EXAMPLE 2

The same procedure as in Example 1 was repeated with the exception of using 60 wt. % of a urethane prepolymer (polyolefin type) having an isocyanate content of 1.5 wt. % and a melt viscosity of 3,000 cps at 85° C., and 40 wt. % of a hydrogenated petroleum resin (ARKON P-125, product of Arakawa Chemical Industries Ltd.) serving as a tackifier. Table 2 shows the results.

EXAMPLE 3

The same procedure as in Example 1 was repeated with the exception of using 50 wt. % of a urethane prepolymer (polyolefin type) having an isocyanate content of 3.0 wt. % and a melt viscosity of 23,000 cps at 85° C., and 50 wt. % of a terpene phenol resin (YS POLYSTER S145, product of Yasuhara Chemical Co., Ltd.) serving as a tackifier. Table 2 shows the results.

EXAMPLE 4

The same procedure as in Example 1 was repeated with the exception of using 30 wt. % of a urethane prepolymer (polyolefin type) having an isocyanate content of 1.3 wt. % and a melt viscosity of 2,800 cps at 85° C., and 70 wt. % of a styrene resin (FTR 6100, product of Mitsui Petrochemical Industries, Ltd.) serving as a tackifier. Table 2 shows the results.

EXAMPLE 5

The same procedure as in Example 1 was repeated with the exception of using 43 wt. % of a urethane prepolymer (polyolefin type) having an isocyanate content of 2.0 wt. % and a melt viscosity of 7,000 cps at 85° C., 53 wt. % of a hydrogenated petroleum resin (ARKON P-125, product of Arakawa Chemical Industries Ltd.) serving as a tackifier, 2 wt. % of SEBS resin (KRATON G1652, product of Shell Kagaku K.K.) and 2 wt. % of liquid paraffin (CRYSTOL 352, product of Esso Sekiyu K.K.). Table 2 shows the results.

EXAMPLE 6

The same procedure as in Example 1 was repeated with the exception of using 48.5 wt. % of a urethane prepolymer (polyolefin type) having an isocyanate content of 2.5 wt. % and a melt viscosity of 13,000 cps at 85° C., 50 wt. % of a sytrene resin (FTR 6100, product of Mitsui Petrochemical Industries, Ltd.) serving as a tackifier and 1.5 wt. % of a wax (SASOL WAX H, product of SASOL, South Africtan Coal Oil Gas Corp., Ltd.). Table 2 shows the results.

COMPARATIVE EXAMPLE 1

Polypropylene glycol and diphenylmethane diisocyanate were subjected to addition polymerization in the usual manner to prepare a urethane prepolymer (polyether type) having an isocyanate group at each end. The urethane prepolymer was 1.5 wt. % in isocyanate content and 1,000 cps in melt viscosity at 85° C.

The same procedure as in Example 1 was then repeated with the exception of using 55 wt. % of this urethane prepolymer and 45 wt. % of a terpene phenol resin (YS POLYSTER S145, product of Yasuhara Chemical Co., Ltd.) serving as a tackifier. Table 2 shows the results.

COMPARATIVE EXAMPLE 2

The same procedure as in Example 1 was repeated with the exception of using 40 wt. % of the same urethane prepolymer as used in Comparative Example 1, 50 wt. % of a terpene phenol resin (YS POLYSTER S145, product of Yasuhara Chemical Co., Ltd.) serving as a tackifier and 10 wt. % of liquid paraffin (CRYSTOL 352, product of Esso Sekiyu K.K.). Table 2 shows the results.

COMPARATIVE EXAMPLE 3

The same procedure as in Example 1 was repeated with the exception of using 60 wt. % of the same urethane prepolymer as used in Comparative Example 1, and 40 wt. % of coumarone-indene resin (ESUCRON V-120, product of Nippon Steel Chemical Co., Ltd.) serving as a tackifier. Table 2 shows the results.

COMPARATIVE EXAMPLE 4

The same procedure as in Example 1 was repeated with the exception of using 50 wt. % of the same urethane prepolymer as used in Comparative Example 1, 25 wt. % of terpene phenolic resin (YS POLYSTER S145, product of Yasuhara Chemical Co., Ltd.) serving as a tackifier and 25 wt. % of coumarone-indene resin (ESUCRON V-120, product of Nippon Steel Chemical Co., Ltd.) as a tackifier. Table 2 shows the results.

TABLE 2

| Component of adhesive composition | Ex. 1 | Ex. 2 | Ex. 3 | Ex. 4 | Ex. 5 | Ex. 6 |
|---|---|---|---|---|---|---|
| Urethane prepolymer | | | | | | |
| Polyolefin type | 50 | 60 | 50 | 30 | 43 | 48.5 |
| Polyether type | — | — | — | — | — | — |
| Melt viscosity at 85° C. (cps) | 6500 | 3000 | 23000 | 2800 | 7000 | 13000 |
| Isocyanate content (wt. %) | 2.0 | 1.5 | 3.0 | 1.3 | 2.0 | 2.5 |
| Tackifier | | | | | | |
| C9 petroleum resin (NEOPOLYMER S) | 50 | — | — | — | — | — |
| Hydrogenaied petroleum resin (ARKON P-125) | — | 40 | — | — | 53 | — |
| Terpene phenol resin (YS POLYSTER S145) | — | — | 50 | — | — | — |
| Styrene resin (FTR 6100) | — | — | — | 70 | — | 50 |
| Coumarone-indene resin (ESUCRON V-120) | — | — | — | — | — | — |
| Others | | | | | | |
| SEBS resin (KRATON G1652) | — | — | — | — | 2 | — |
| Liquid paraffin (CRYSTOL 352) | — | — | — | — | 2 | — |
| Wax (SASOL WAX M) | — | — | — | — | — | 1.5 |

| Component of adhesive composition | Comp. Ex. 1 | Comp. Ex. 2 | Comp. Ex. 3 | Comp. Ex. 4 |
|---|---|---|---|---|
| Urethane prepolymer | | | | |
| Polyolefin type | — | — | — | — |
| Polyether type | 55 | 40 | 60 | 50 |
| Melt viscosity at 85° C. (cps) | 1000 | 1000 | 1000 | 1000 |
| Isocyanate content (wt. %) | 1.5 | 1.5 | 1.5 | 1.5 |
| Tackifier | | | | |
| C9 petroleum resin (NEOPOLYMER S) | — | — | — | — |
| Hydrogenated petroleum resin (ARKON P-125) | — | — | — | — |
| Terpene phenol resin (YS POLYSTER S145) | 45 | 50 | — | 25 |
| Styrene resin (FTR 6100) | — | — | — | — |
| Coumarone-indene resin (ESUCRON V-120) | — | — | 40 | 25 |
| Others | | | | |
| SEBS resin (KRATON G1652) | — | — | — | — |
| Liquid paraffin (CRYSTOL S52) | — | 10 | — | — |
| Wax (SASOL WAX H) | — | — | — | — |

| Properties of adhesive composition | Ex. 1 | Ex. 2 | Ex. 3 | Ex. 4 | Ex. 5 |
|---|---|---|---|---|---|
| Melt viscosity, 100° C. (cps) | 15000 | 3500 | 40000 | 3200 | 15000 |
| Storage stability, 90° C. (months) | Over 4.0 | Over 4.5 | 3.0 | Over 4.5 | Over 4.5 |
| Viscosity stability, 100° C. | | | | | |
| 4 hours later (cps) | 15600 | 3600 | 48000 | 3500 | 19000 |
| 8 hours later (cps) | 23000 | 3900 | 60000 | 4100 | 26000 |
| Reaction rate 20° C., 60% RH (hr) | 12 | 12 | 12 | 12 | 12 |
| Initial adhesion 20° C., 60% RH (min) | No break | 15 | No break | No break | No break |
| Final adhesion | | | | | |
| 20° C. (kg/25 mm × 25 mm) | 26.0 | 18.0 | 33.3 | 20.0 | 31.0 |
| 80° C. (kg/25 mm × 25 mm) | 4.4 | 7.3 | 12.5 | 5.3 | 11.0 |
| Weather resistance xenon lamp (hr) | Over 150 | Over 150 | Over 150 | Over 150 | Over 150 |
| Offensive odor, sensory test | No | No | No | No | No |

TABLE 2-continued

| Compatibility | | | | | |
|---|---|---|---|---|---|
| kneading at 120° C. | A | A | A | A | A |
| phase separation at 20° C. | A | A | A | A | A |

| Properties of adhesive composition | Ex. 6 | Comp. Ex. 1 | Comp. Ex. 2 | Comp. Ex. 3 | Comp. Ex. 4 |
|---|---|---|---|---|---|
| Melt viscosity, 100° C. (cps) | 18000 | 12000 | 25000 | 9300 | 8200 |
| Storage stability, 90° C. (months) | Over 4.5 | 2.1 | 2.0 | Over 3.0 | 2.8 |
| Viscosity stability, 100° C. | | | | | |
| 4 hours later (cps) | 20000 | 19000 | 30000 | 10000 | 12000 |
| 8 hours later (cps) | 27000 | 30000 | 53000 | 12000 | 23000 |
| Reaction velocity 20° C., 60% RH (hr) | 12 | 96 | 96 | 96 | 96 |
| Initial adhesion 20° C., 60% RH (min) | No break | 12 | No break | 15 | No break |
| Final adhesion | | | | | |
| 20° C. (kg/25 mm × 25 mm) | 16.5 | 10.3 | 8.5 | 5.3 | 7.0 |
| 80° C. (kg/25 mm × 25 mm) | 7.0 | 2.7 | 3.0 | 1.5 | 1.8 |
| Weather resistance xenon lamp (hr) | Over 150 | 72 | 100 | 48 | 60 |
| Offensive odor, sensory test | No | No | No | Yes | Yes |
| Compatibility | | | | | |
| kneading at 120° C. | A | A | A | A | A |
| phase separation at 20° C. | A | A | A | A | A |

The results given in Table 2 reveal that the urethane prepolymer (polyolefin type) having an isocyanate group at each end, prepared by reacting a diisocyanate with a polyolefin diol having a hydroxyl group at each end and used according to the invention exhibited improved compatibility with various tackifiers, and that the properties of the urethane prepolymer (polyolefin type) and the properties of the tackifier admixed therewith provided reactive hotmelt adhesive compositions which were improved in storage stability, viscosity stability for application, reaction velocity, initial and final adhesion, heat resistance, weather resistance, etc. and which were diminished in offensive odor.

In contrast, the reactive hotmelt adhesive compositions of Comparative Examples 1 to 4 wherein a urethane prepolymer of the polyether type was used were all insufficient in storage stability, low in reaction velocity, reduced in initial and final adhesion and low in weather resistance. Especially, the adhesive compositions of Comparative Examples 3 and 4 incorporating the coumarone-indene resin released a strong offensive odor and were inferior in properties.

What is claimed is:

1. A reactive hotmelt adhesive composition consisting of a urethane prepolymer having a melt viscosity in the range of 1,000 to 30,000 cps at 85° C. and an isocyanate group at each of its opposite ends, and obtained by reacting a diisocyanate with a polyolefin diol having a hydroxy group at each of its opposite ends; and a tackifier substantially unreactive with the urethane prepolymer and compatible therewith; said adhesive composition having a melt viscosity in the range of 3,200 to 40,000 cps at 100° C.

2. A composition as defined in claim 1 wherein the polyolefin diol having a hydroxyl group at each end has a saturated hydrocarbon skeleton like low-molecular-weight polyolefins and the hydroxyl group at each of opposite ends of the skeleton, and is 1,000 to 3,000 molecular weight.

3. A composition as defined in claim 1 wherein the diisocyanate reacted with the polyolefin diol Is a compound selected from the group consisting of 4,4'-diphenylmethane diisocyanate, 2,4-tolylene diisocyanate, 2,6-tolylene diisocyanate, hexamethylene diisocyanate and 1,5 naphthylene diisocyanate.

4. A composition as defined in claim 1 wherein the urethane prepolymer having an isocyanate group at each end has an isocyanate content of 1.2 to 3.3 wt. %.

5. A composition as defined in claim 1 wherein the tackifier is a resin selected from the group consisting of rosin ester resin, hydrogenated rosin ester resin, polyterpene resin, terpene phenolic resin, aromatic modified terpene resin, hyrogenated products of such terpene resins, $C_5$ aliphatic-, $C_9$ aromatic- and $C_9$ alicyclic-petroleum resins, hydrogenated products of such petroleum resins, styrene resin, $C_5$ monomer-styrene copolymer and $C_9$ monomer-styrene copolymer.

6. A composition as defined in claim 5 wherein the tackifier has a softening temperature of 40° to 150° C.

7. A composition as defined in claim 1 which comprises 70 to 30 wt. % of the urethane prepolymer and 30 to 70 wt. % of the tackifier.

* * * * *